Nov. 1, 1966   E. G. DE WITT ET AL   3,283,046

METHOD FOR FORMING HOLLOW ARTICLES

Filed Sept. 28, 1964   2 Sheets-Sheet 1

United States Patent Office 3,283,046
Patented Nov. 1, 1966

3,283,046
METHOD FOR FORMING HOLLOW ARTICLES
Earl G. De Witt and Frederick T. Tulley, Baton Rouge, La., assignors to Ethyl Corporation, New York, N.Y., a corporation of Virginia
Filed Sept. 28, 1964, Ser. No. 399,605
6 Claims. (Cl. 264—92)

This invention relates to the fabrication of hollow articles from thermoplastic preforms or parisons.

The most common method of producing hollow articles from thermoplastic material by blow molding is to extrude a preform of the hot plastic material, surround the preform while it is still hot with a mold and then force air into the preform to expand it to the shape of the mold cavity, or create a vacuum within the mold to draw the plastic preform to conform to the mold walls. This requires that an extruding machine be located at, or incorporated as a part of, each blow molding machine. Since extruding machines are rather expensive, and extrusion know-how is limited, the production of blow molded containers is usually restricted to fairly large producers who can afford the investment. Users of moderate quantities of blow molded containers have not been able to justify the large investment required in order to produce their own containers at their plant sites.

Additionally, there are certain thermoplastic materials that cannot be satisfactorily converted to finished containers by the procedure set forth above. There are certain thermoplastic materials that cannot be held at a temperature at which they may be extruded for an appreciable length of time without decomposition taking place. The optimum rate for extrusion is often not the optimum rate at which the blow molding apparatus is designed to operate.

These and other problems which are inherent in the single-step blow molding technique have, to some extent, been overcome by the two-step method of blow molding containers. In the two-step process, a hollow preform or parison is extruded in appropriate lengths and then cooled, or extruded in a long length, cooled and cut into sections. The parisons may be boxed for storage and shipped to another site for use in blow molding containers. The cold parisons are placed on carriers or support bases and passed through an oven to heat the parisons to a softened state. The softened parisons then move to the mold where they are blown to the desired shape. Devices and techniques for producing hollow articles from thermoplastic materials using the two-step process are disclosed in U.S. Patents 2,792,593 and 3,079,637. Other machines have been developed which employ the two-step process wherein the parison is supported from its upper end while it is transported through a heating oven.

The method of supporting a parison at its base end with internal support being provided by a cylindrical spindle or inverted U shaped wires has not proved completely satisfactory. The most serious problem is sagging, bending or slumping of the parison when it is heated. This causes an uneven wall thickness and when the hot parison is blow molded the formed article has a thick wall section over the portion formed from the lower end of the parison and a thin wall section over the portion formed from the upper end of the parison. Internal support mechanisms for parisons introduce serious complications when producing thin-walled, large-diameter containers that have both an integrally formed hollow handle and a small neck. The internal supporting spindle or wires cannot exceed the size of the finished neck opening, yet these containers require that large diameter thin-wall parisons be used. An additional problem is that a major portion of the end of the parison at which the handle is formed must be void of any internal support structure in order that the mold halves may squeeze a portion of the wall of the parison together to form the hollow handle (see U.S. Patent 3,120,679 for an exemplary apparatus for forming hollow-handled plastic containers).

Two-step blow molding apparatus wherein each parison is suspended vertically from its upper end requires complicated loading and suspending mechanisms. In addition when the parison is supported by its upper end it tends to elongate from its own weight when it passes through a heating oven. Residual strains set up in the parison when it was produced often cause the parison to bend or deform when it is heated prior to blow molding. The deformed hot parison produces containers having weak walls or other defects which cause the container to be rejected. The stepwise movement of the transport mechanism on the top supported type blow molding apparatus often causes the soft parison to swing from side-to-side in a pendulum like action. This often results in the mold closing on a parison when it is not vertically centered in the mold. This generally causes one wall of the container to blow out when air pressure is applied to the interior of the parison.

An object of this invention is to provide an improved method of producing a hollow article from a thermoplastic parison.

Another object of this invention is to provide a method of producing a hollow article which results in a substantial reduction in the number of rejectable finished articles produced by blow molding a thermoplastic parison.

Still another object of this invention is to provide a method of producing hollow articles from thermoplastic material by blow molding which method is more economical than methods used heretofore.

A further object of this invention is to provide a method of blow molding articles from thermoplastic preforms wherein the preform is prevented from becoming distorted when it is in the softened state prior to enclosing it within the mold cavity.

The process of the present invention for forming a hollow article may be carried out by surrounding a vertically disposed, rigid thermoplastic parison with a close fitting, heat conducting container. The parison and surrounding container are then moved through an area having a temperature sufficiently high to soften the parison. The metal container is then separated from the softened parison and the parison is enclosed substantially within a blow mold cavity. A pressurized fluid is then injected into the interior of the softened parison to expand the parison to form the hollow article. The hollow article is then removed from the interior of the mold.

An alternate embodiment of the process of the present invention utilizes a vacuum created within the hollow mold interior to draw the softened parison into the shape of the mold walls.

The foregoing and other objects and advantages of the present invention will become apparent from a consideration of the following description, the appended claims, and the drawings in which:

Figure 1:
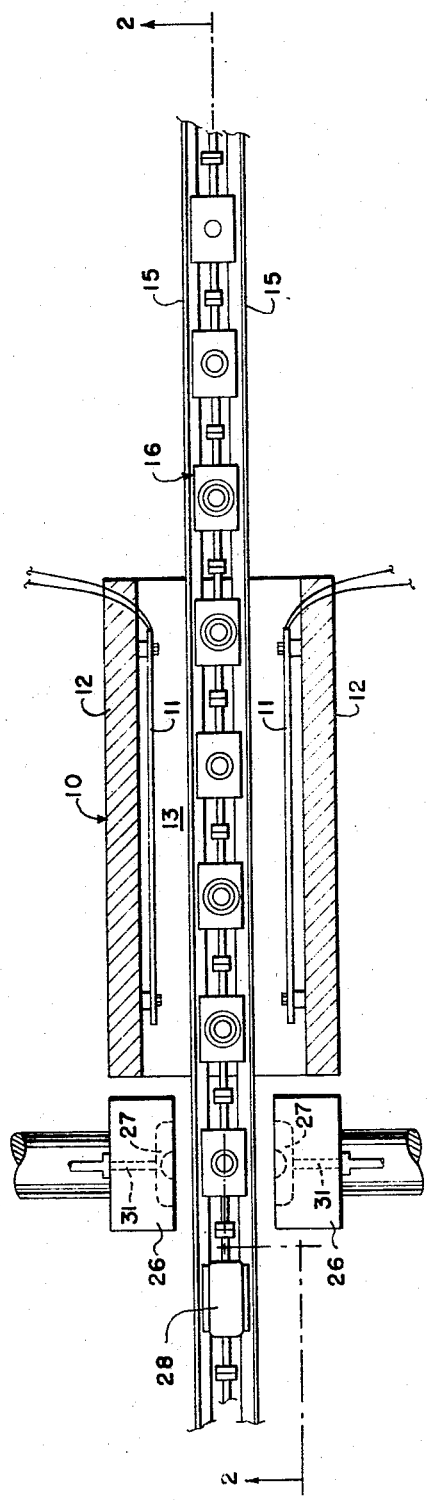
FIGURE 1 is a plan view, partially in section, of a blow molding apparatus adapted for carrying out the process of the present invention.

Referring now to FIGURE 1, the blow molding apparatus adapted for carrying out the process of the present invention includes an elongated oven, designated generally by the numeral 10. The oven is heated by an electrical strip heater 11 attached to each side wall 12 of the oven. The side walls 12, 12, bottom 13 and top 14 of the oven are preferably insulated with a suitable insulation material, e.g., glass wool. If desired, a glass or asbestos cloth curtain (not shown) may be provided at the open ends of the oven to retain the heat within the oven. A fan to circulate the air (not shown) may also be provided in the oven if desired. The free air temperature within the oven can be controlled at the desired point by use of suitable thermostatic electrical control devices to control the power input to the strip heaters 11, 11.

The oven has extending therethrough a track made of two spaced apart L-shaped track members 15, only a portion of the track being shown in the drawings. The complete track is in a closed loop similar to a conventional race track. The track may be supported on any suitable support (not shown) if desired. A plurality of base assemblies, designated generally by the numeral 16, are slidably mounted on the track.

Figure 3:
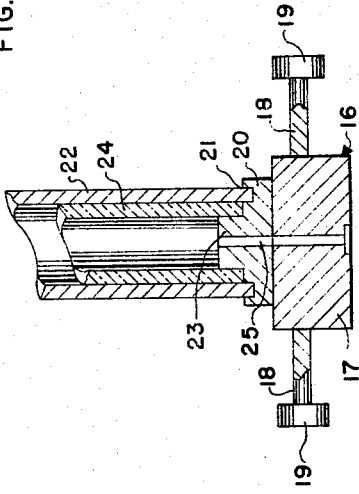
FIGURE 3 is an enlarged, vertical sectional view of one of the base support units with a thermoplastic parison and a cylindrical container for the parison in place on the base unit.

Referring now to FIGURE 3, each base assembly 16, includes a rectangular body portion 17 having a width slightly less than the track width so that it will slide freely within track members 15, 15. An arm 18 extends longitudinally outward from two opposite sides of the body. The arms have cylindrical disks 19 affixed to their ends. The arms of adjacent base assemblies serve to space the base assemblies apart as they move down the track through the oven, as may be seen in FIGURES 1 and 2. A cylindrical top member 20 is fixed to the body 17. The top member is provided with a cylindrical recess 21 in its upper surface which receives the lower end of the cylindrical, open-ended parison container 22. A central cylindrical boss 23 projects upward from the upper surface of the top member 20. The lower end of a thermoplastic preform, or parison 24 is slidably fitted over the boss 23. The container 22 makes a snug but freely sliding fit over the exterior of the parison 24. The boss 23 should be high enough and the recess 21 in top member 20 should be deep enough to keep the parison and container, respectively, from tipping over when the base assembly moves down the track. A cylindrical bore 25 is provided in the base assembly to admit air to the interior of the parison 24.

As seen in FIGURES 1 and 3, a mold assembly, including matching mold halves 26, 26, is positioned to close around each one of the parisons as it emerges from the oven. Each mold half 26 is provided with a complemental mold cavity 27, which defines the shape of the blown thermoplastic article. A bore 31 is provided in each mold half which may be connected to a source of vacuum if desired. The mold halves may be closed and separated by a conventional hydraulic, or mechanical mechanism (not shown).

The process of the present invention may be carried out using the apparatus exemplified in the drawings. The preforms or parisons 24 are placed on the base assemblies 16 as they move around the track from right to left. The parisons 24 may be precut lengths of thermoplastic cylindrical tubing, or they may be of a shape other than cylindrical. The thermoplastic material used to form the parisons 24 may be any one of a number of materials used to blow mold articles, e.g., polyethylene, polypropylene, and polyvinyl chloride. The process of the present invention is particularly adapted for use in forming hollow articles when polyvinyl chloride is used as the thermoplastic material. The parisons may be loaded on the bases by hand using one or more operators or a loading device for automatically loading the parisons may be used. A suitable loading device for use in the present invention is shown in U.S. Patent 3,079,637. After the parison is placed on the base, a parison container 22 is placed over the parison. The container 22 should preferably be constructed of a metal such as brass, copper, or other heat conducting material. The containers 22 may be placed over the parisons 24 by a similar loading machine as used to place the parison on the base. Also, it is permissible to place the parisons inside of the containers in a separate operation and then load the parison-container unit on each base member.

Figure 2:
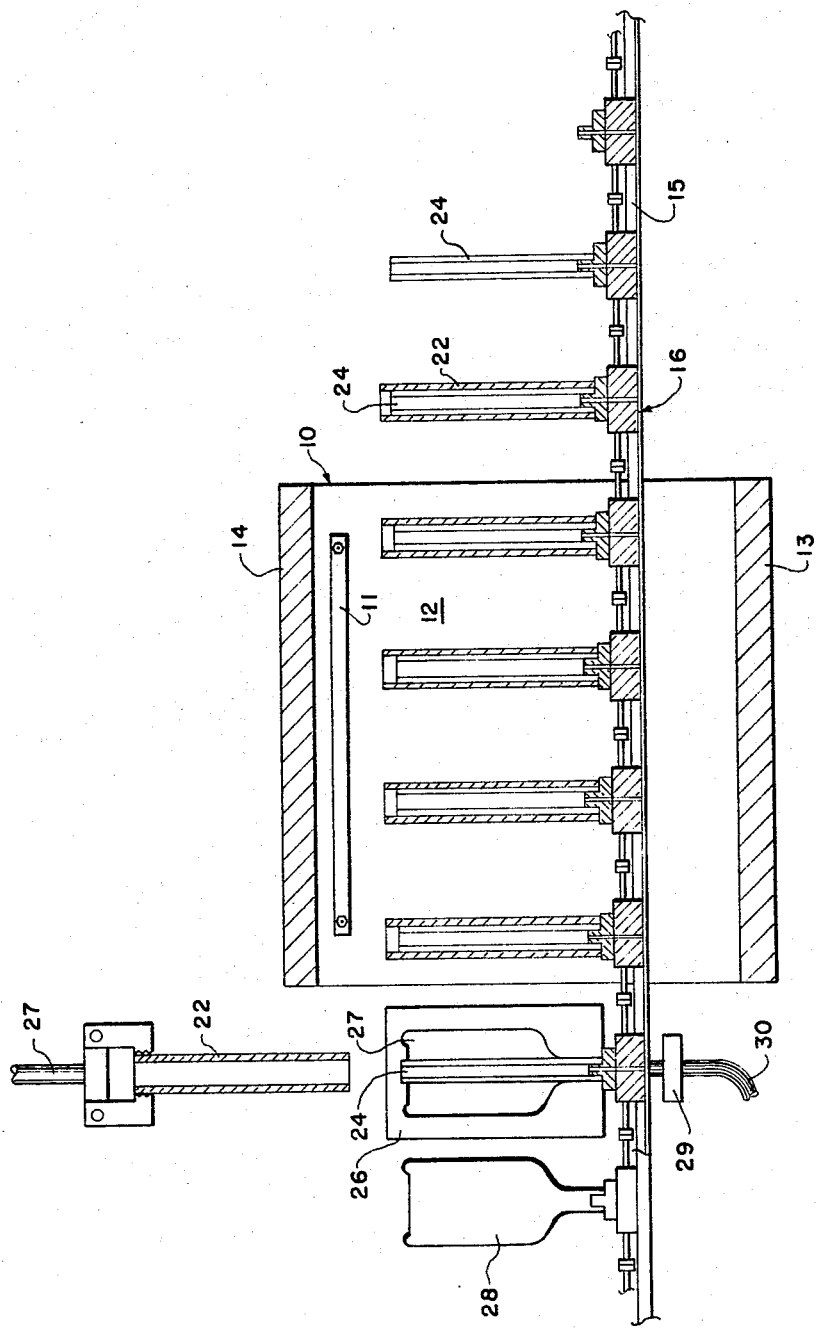
FIGURE 2 is an elevational view of the apparatus taken along line 2—2 of FIGURE 1.

A pusher, or shifting mechanism (not shown), engages each of the base units 16 as it passes a particular station and moves it forward a certain distance thereby causing all the base units to move from right to left around the closed track. As each base member 16 moves step-wise through the oven 10, the parison 24 is heated to a softened state by the heat conducted through the container 22. When one base unit is centered between the mold halves, as seen in FIGURE 2, a container removal arm 27 lifts the container upward separating the container and parison. Other suitable mechanisms may be used to lower the container if desired. The mold halves then close pinching the parison at its upper end to form a seal. The bottle 28, or other desired article is then formed by admitting air into the interior of the parison within the mold. A compressed air supply fitting 29 is adapted to engage the bottom side of each base assembly when it is positioned beneath the mold and to admit air from air hose 30 through the bore 25 in the base into the parison. The mold halves 26, 26 may be cooled by air circulation or other suitable means to chill the blow molded article by contacting the interior walls of the mold. The cooled bottle 28 may be removed from the base by hand or by a suitable machine.

If desired, the bottle 28 may be formed by applying a vacuum to the interior of the mold through the bore 31 in each mold half 26, in which case no compressed air is required.

The rigid container supports the parison as it is softened by the heat and keeps it from being bent to one side by the stepwise motion of the base supports as they are moved through the oven. The container also prevents the parison from slumping or sagging from the heat since it provides a continuous support of the exterior surfaces of the parison. The container also serves to distribute the heat more uniformly throughout the length of the parison and thus makes for a more uniform wall thickness in the finished article.

It is understood that various changes and modifications to the apparatus described herein and to the method of carrying out the present invention may be made without departing from the spirit and scope of the invention.

What is claimed is:
1. A method for forming a hollow article comprising;
 (a) surrounding a vertically disposed, rigid, thermoplastic parison with a close fitting, heat conducting container;
 (b) moving said parison with said surrounding container through an area having a temperature sufficiently high to soften said parison;
 (c) separating said container from said softened parison;
 (d) enclosing said softened parison substantially within a blow mold cavity;
 (e) introducing a pressurized fluid into the interior of said softened parison to expand said parison to form the hollow article; and
 (f) removing the hollow article from the interior of said mold.

2. A method for forming a hollow article comprising;
 (a) surrounding a vertically disposed, rigid, thermoplastic parison with a close fitting, heat conducting container;
 (b) moving said parison with said surrounding container through an area having a temperature sufficiently high to soften said parison;
 (c) separting said container from said softened parison;

(d) enclosing said softened parison substantially within a blow mold cavity;
(e) creating a vacuum in the blow mold cavity in the space external to said parison to expand said parison to form the hollow article; and
(f) removing the hollow article from the interior of said mold.

3. A method for forming a hollow article comprising;
(a) surrounding a vertically disposed, rigid, thermoplastic parison with a close fitting, heat conducting container;
(b) moving said parison with said surrounding container through an area having a temperature sufficiently high to soften said parison;
(c) removing said container from said softened parison;
(d) enclosing said softened parison substantially within a blow mold cavity;
(e) introducing a pressurized fluid into the interior of said softened parison to expand said parison to form the hollow article; and
(f) removing the hollow article from the interior of said mold.

4. A method for forming a hollow article comprising;
(a) surrounding a vertically disposed, rigid, thermoplastic parison with a close fitting, heat conducting container;
(b) moving said parison with said surrounding container through a heating oven in a series of stepwise movements, said oven having an air temperature sufficiently high to soften said parison;
(c) stopping said parison and associated container between the open halves of a split blow mold;
(d) removing said container from said softened parison;
(e) closing said split blow mold around said softened parison;
(f) introducing a pressurized fluid into the interior of said softened parison to expand said parison to form the hollow articles; and
(g) removing the hollow article from the interior of said mold.

5. A method for forming hollow articles comprising;
(a) supporting a plurality of vertically disposed, rigid, thermoplastic parisons on their lower ends by means of movable, individual bases;
(b) surrounding each of said parisons with a close fitting, heat conducting container which is supported by said individual base to provide an integral assembly;
(c) moving said plurality of assemblies through an oven to heat said plurality of parisons to a softened state;
(d) removing each one of said containers from each one of said softened parisons;
(e) enclosing each one of said softened parisons within a blow mold;
(f) introducing a pressurized fluid into the interior of each one of said softened parisons to expand said parisons to form the hollow articles; and
(g) removing each one of the hollow articles from the blow mold.

6. A method for forming hollow articles comprising;
(a) supporting a plurality of vertically disposed, rigid, thermoplastic parisons on their lower ends by means of movable, individual bases;
(b) surrounding each of said parisons with a close fitting, heat conducting container which is supported by said individual base to provide an integral assembly;
(c) moving said plurality of assemblies consecutively through an oven to heat said plurality of parisons to a softened state;
(d) removing each one of said containers consecutively from each one of said softened parisons;
(e) enclosing each one of said softened parisons consecutively within a blow mold;
(f) introducing a pressurized fluid consecutively into the interior of each one of said softened parisons to expand said parisons to form the hollow articles; and
(g) removing each one of the hollow articles consecutively from the blow mold.

No references cited.

ROBERT F. WHITE, *Primary Examiner.*

A. R. NOE, *Assistant Examiner.*